US010435527B2

(12) United States Patent
Praetorius et al.

(10) Patent No.: US 10,435,527 B2
(45) Date of Patent: Oct. 8, 2019

(54) DUAL COMPONENT LLDPE COPOLYMERS WITH IMPROVED IMPACT AND TEAR RESISTANCE

(71) Applicant: Chevron Phillips Chemical Company LP, The Woodlands, TX (US)

(72) Inventors: Jeremy M. Praetorius, Bartlesville, OK (US); Chung C. Tso, Bartlesville, OK (US); Qing Yang, Bartlesville, OK (US); Yongwoo Inn, Bartlesville, OK (US); John T. Blagg, Nowata, OK (US); Ashish M. Sukhadia, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 32 days.

(21) Appl. No.: 15/715,215

(22) Filed: Sep. 26, 2017

(65) Prior Publication Data
US 2019/0092912 A1    Mar. 28, 2019

(51) Int. Cl.
*C08J 5/18* (2006.01)
*C08L 23/08* (2006.01)

(52) U.S. Cl.
CPC .............. *C08J 5/18* (2013.01); *C08L 23/0815* (2013.01); *C08J 2323/06* (2013.01); *C08J 2323/08* (2013.01); *C08J 2423/06* (2013.01); *C08J 2423/08* (2013.01); *C08L 2201/10* (2013.01); *C08L 2203/16* (2013.01); *C08L 2207/062* (2013.01); *C08L 2207/066* (2013.01)

(58) Field of Classification Search
CPC .......................... C08L 23/04; B60K 15/03177
See application file for complete search history.

(56) References Cited

U.S. PATENT DOCUMENTS

| | | | |
|---|---|---|---|
| 5,382,630 | A | 1/1995 | Stehling et al. |
| 5,677,383 | A | 10/1997 | Chum et al. |
| 6,242,545 | B1 | 6/2001 | Jejelowo et al. |
| 6,248,845 | B1 | 6/2001 | Loveday et al. |
| 6,528,597 | B2 | 3/2003 | Loveday et al. |
| 6,936,675 | B2 | 8/2005 | Szul et al. |
| 6,956,088 | B2 | 10/2005 | Farley et al. |
| 6,984,695 | B2 | 1/2006 | Brown et al. |
| 7,119,153 | B2 | 10/2006 | Jensen et al. |
| 7,135,526 | B2 | 11/2006 | Farley |
| 7,172,816 | B2 | 2/2007 | Szul et al. |
| 7,179,876 | B2 | 2/2007 | Szul et al. |
| 7,381,783 | B2 | 6/2008 | Loveday et al. |
| 7,572,875 | B2 | 8/2009 | Jensen |
| 7,989,564 | B2 | 8/2011 | Loveday et al. |
| 8,114,946 | B2 | 2/2012 | Yang et al. |
| 8,227,564 | B2 | 7/2012 | Loveday et al. |
| 8,399,581 | B2 | 3/2013 | Farley et al. |
| 9,217,049 | B2 | 12/2015 | Yang et al. |
| 9,346,896 | B2 | 5/2016 | McDaniel et al. |
| 9,441,061 | B2 | 9/2016 | Tso et al. |
| 9,574,031 | B2 | 2/2017 | Yang et al. |
| 2013/0075409 | A1* | 3/2013 | Kapur .............. B60K 15/03177 220/562 |
| 2014/0128563 | A1 | 5/2014 | McDaniel et al. |
| 2014/0256899 | A1 | 9/2014 | Tso et al. |
| 2015/0368377 | A1 | 12/2015 | Lester et al. |

FOREIGN PATENT DOCUMENTS

| | | |
|---|---|---|
| WO | 1994025523 A1 | 11/1994 |
| WO | 1999014271 A1 | 3/1999 |

OTHER PUBLICATIONS

International Search Report issued in corresponding PCT/US2018/051614 dated Nov. 26, 2018, 4 pages.
"Help farmers protect their harvests using eXtreme Performance agricultural film," ExxonMobil, Exceed™ XP, 2016, 2 pages.
"Help producers protect their liquid products using eXtreme Performance packaging," ExxonMobil, Exceed™ XP, 2016, 2 pages.
Arnett et al., entitled "*Zero-Shear Viscosity of Some Ethyl Branched Paraffinic Model Polymers*," Journal of Physical Chemistry, 1980, 84(6), pp. 649-652.
Bird et al., entitled "*Dynamics of Polymeric Liquids*," vol. 1, Fluid Mechanics, 2nd Edition, John Wiley & Sons, 1987, 3 pages.
*Film Extrusion Manual—Process, Materials, Properties*, TAPPI Press, 1992, 16 pages.
Hieber et al., entitled "*Shear-Rate-Dependence Modeling of Polymer Melt Viscosity*," Polymer Engineering and Science, 1992, 32(14), pp. 931-938.
Hieber et al., entitled "*Some correlations involving the shear viscosity of polystyrene melts*," Rheologica Acta, 1989, vol. 28, pp. 321-332.
Janzen et al., entitled "*Diagnosing long-chain branching in polyethylenes*," J. Mol. Struct., 485-486 (1999) 569-584.
*Modern Plastics Encyclopedia*, Mid-Nov. 1995 Issue, vol. 72, No. 12, 3 pages.
Yu et al., entitled "*Long Chain Branches in Metallocene-Catalyzed Polyethylene Determined by a Combination of SEC/Multi-Angle Light Scattering, NMR and Rheology*," published in Polymer Preprints, 2003, vol. 44(2), pp. 49-50.
Benjamin Monrabal, et al. "Crystallization Elution Fractionation and Thermal Gradient Interaction Chromatography. Techniques Comparison." Macromol. Symp. (2012), 312, Wiley-VCH Verlag GmbH & Co. KGaA, Weinhelm, pp. 115-129.

* cited by examiner

*Primary Examiner* — Lawrence D Ferguson
(74) *Attorney, Agent, or Firm* — Merchant & Gould P.C.

(57) ABSTRACT

Disclosed are ethylene polymer compositions containing a homogeneously-branched first ethylene polymer component and a homogeneously-branched second ethylene polymer component of higher density than the first ethylene polymer component. The ethylene polymer composition can be characterized by a density from 0.912 to 0.925 g/cm$^3$, a melt index less than 3.5 g/10 min, and a CY-a parameter at 190° C. from 0.25 to 0.65. These polymer compositions have the excellent dart impact strength and optical properties of a metallocene-catalyzed LLDPE, but with improved machine direction tear resistance, and can be used in blown film and other end-use applications.

20 Claims, 4 Drawing Sheets

DUAL COMPONENT LLDPE COPOLYMERS WITH IMPROVED IMPACT AND TEAR RESISTANCE

BACKGROUND OF THE INVENTION

Polyolefins such as high density polyethylene (HDPE) homopolymer and linear low density polyethylene (LLDPE) copolymer can be produced using various combinations of catalyst systems and polymerization processes. Ziegler-Natta and chromium-based catalyst systems can, for example, produce ethylene polymers having good extrusion processability and polymer melt strength and bubble stability in blown film applications, typically due to their broad molecular weight distribution (MWD). Further, films produced using Ziegler-Natta catalyst systems have good tear resistance in both the machine direction (MD) and the transverse direction (TD), but generally suffer from poor impact strength. In contrast, metallocene-based catalyst systems can, for example, produce ethylene polymers having excellent impact strength and optical properties, but often lack superior tear resistance, particularly in the machine direction.

In some end-uses, such as blown film applications, it can be beneficial to have the impact resistance and optical properties of a metallocene-catalyzed LLDPE copolymer, but with improved MD tear resistance. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

The present invention generally relates to ethylene polymer compositions containing (i) a homogeneously-branched first ethylene polymer component, and (ii) a homogeneously-branched second ethylene polymer component of higher density than the first ethylene polymer component. Generally, the amount of the second ethylene polymer component can be in a range from about 4 to about 50 wt. %, from about 4 to about 25 wt. %, or from about 10 to about 25 wt. %, based on the total weight of the first ethylene polymer component and the second ethylene polymer component. The ethylene polymer composition can be characterized by a density in a range from about 0.912 to about 0.925 g/cm$^3$, a melt index less than or equal to about 3.5 g/10 min, and a CY-a parameter at 190° C. in a range from about 0.25 to about 0.65. The first ethylene polymer component often can have a density in a range from about 0.89 to about 0.922 g/cm$^3$ (or from about 0.905 to about 0.918 g/cm$^3$), while the second ethylene polymer component can have a density in a range from about 0.93 to about 0.972 g/cm$^3$ (or from about 0.945 to about 0.968 g/cm$^3$).

Additionally or alternatively, the ethylene polymer composition can have an ATREF profile characterized by at least two peaks, with a first peak (a lower temperature peak) at a temperature in a range from about 67 to about 82° C. (or from about 68 to about 80° C.), and a second peak (a higher temperature peak) at a temperature in a range from about 92 to about 105° C. (or from about 96 to about 105° C.). Moreover, the difference between the temperatures of the two peaks (ΔT) often can fall within a range from about 17 to about 32° C. (or from about 18 to about 30° C.).

These ethylene polymer compositions, in further aspects, can be characterized by a melt index (MI) in a range from about 0.3 to about 2 g/10 min (or from about 0.5 to about 1.8 g/10 min), and/or a ratio of HLMI/MI in a range from about 10 to about 35 (or from about 12 to about 22), and/or a ratio of Mw/Mn in a range from about 1.8 to about 4.5 (or from about 2.2 to about 3.8), and/or a ratio of Mz/Mw in a range from about 1.6 to about 2.5 (or from about 1.7 to about 2.1), and/or a Mw in a range from about 85 to about 200 kg/mol (or from about 100 to about 180 kg/mol), and/or a zero-shear viscosity in a range from about 2,500 to about 25,000 Pa-sec (or from about 3,000 to about 20,000 Pa-sec), and/or less than 10 long chain branches (or less than 5 long chain branches) per million total carbon atoms, and/or a number of short chain branches per 1000 total carbon atoms of the polymer composition at Mw that is greater than at Mn (or at Mz that is greater than at Mn). Moreover, in some aspects of this invention, the polymer composition can contain no measurable amount of hafnium or titanium, i.e., less than 0.1 ppm, and often less than 0.05 ppm.

These ethylene polymer compositions can be used to produce various articles of manufacture, such as films (e.g., blown films), sheets, pipes, geomembranes, and molded products.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects and embodiments may be directed to various feature combinations and sub-combinations described in the detailed description.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and/or feature disclosed herein, all combinations that do not detrimentally affect the designs, compositions, processes, and/or methods described herein are contemplated with or without explicit description of the particular combination. Additionally, unless explicitly recited otherwise, any aspect and/or feature disclosed herein can be combined to describe inventive features consistent with the present disclosure.

While compositions and methods are described herein in terms of "comprising" various components or steps, the compositions and methods can also "consist essentially of" or "consist of" the various components or steps, unless stated otherwise. For example, an ethylene polymer composition consistent with aspects of the present invention can comprise; alternatively, can consist essentially of; or alternatively, can consist of; a first ethylene polymer component and a second ethylene polymer component.

The terms "a," "an," "the," etc., are intended to include plural alternatives, e.g., at least one, unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "polymer" is used herein generically to include ethylene homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from ethylene and any comonomer(s) disclosed herein. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, by a disclosure that the ratio of Mz/Mw can be in a range from about 1.6 to about 2.5, the intent is to recite that the ratio of Mz/Mw can be any ratio in the range and, for example, can be equal to about 1.6, about 1.7, about 1.8, about 1.9, about 2, about 2.1, about 2.2, about 2.3, about 2.4, or about 2.5. Additionally, the ratio of Mz/Mw can be within any range from about 1.6 to about 2.5 (for example, from about 1.8 to about 2.3), and this also includes any combination of ranges between about 1.6 and about 2.5. Likewise, all other ranges disclosed herein should be interpreted in a manner similar to this example.

The term "about" means that amounts, sizes, formulations, parameters, and other quantities and characteristics are not and need not be exact, but may be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

As used herein, "MD" refers to machine direction, and "CD" refers to cross direction. The cross direction also can be referred to herein as the transverse direction (TD).

DETAILED DESCRIPTION OF THE INVENTION

The present invention is directed generally to ethylene polymer compositions containing a lower density component and a higher density component. Articles produced from these ethylene-based polymer compositions, such as blown films, can have excellent dart impact, tear strength (e.g., MD Elmendorf tear strength), and optical properties, despite the presence of the higher density component in the polymer composition.

Ethylene Polymer Compositions

Generally, the ethylene polymer compositions disclosed herein contain (i) a homogeneously-branched first ethylene polymer component, and (ii) a homogeneously-branched second ethylene polymer component of higher density than the first ethylene polymer component. The first ethylene polymer component and the second ethylene polymer component are ethylene-based polymers, or ethylene polymers, encompassing homopolymers of ethylene as well as copolymers, terpolymers, etc., of ethylene and at least one olefin comonomer. Comonomers that can be copolymerized with ethylene often can have from 3 to 20 carbon atoms in their molecular chain. For example, typical comonomers can include, but are not limited to, propylene, 1-butene, 1-pentene, 1-hexene, 1-heptene, 1-octene, and the like, or combinations thereof. In an aspect, the olefin comonomer can comprise a $C_3$-$C_{18}$ olefin; alternatively, the olefin comonomer can comprise a $C_3$-$C_{10}$ olefin; alternatively, the olefin comonomer can comprise a $C_4$-$C_{10}$ olefin; alternatively, the olefin comonomer can comprise a $C_3$-$C_{10}$ α-olefin; alternatively, the olefin comonomer can comprise a $C_5$-$C_{10}$ α-olefin; alternatively, the olefin comonomer can comprise 1-butene, 1-hexene, 1-octene, or any combination thereof; or alternatively, the comonomer can comprise 1-hexene. Typically, the amount of the comonomer, based on the total weight of monomer (ethylene) and comonomer, can be in a range from about 0.01 to about 20 wt. %, from about 0.1 to about 10 wt. %, from about 0.5 to about 15 wt. %, from about 0.5 to about 8 wt. %, or from about 1 to about 15 wt. %.

In one aspect, the ethylene polymer composition, the first ethylene polymer component, and the second ethylene polymer component of this invention, independently, can comprise an ethylene/α-olefin copolymer and/or an ethylene homopolymer. Thus, the ethylene polymer composition, in some aspects, can comprise an ethylene/α-olefin copolymer and an ethylene homopolymer.

In another aspect, the ethylene polymer composition, the first ethylene polymer component, and the second ethylene polymer component, independently, can comprise an ethylene/1-butene copolymer, an ethylene/1-hexene copolymer, an ethylene/1-octene copolymer, an ethylene homopolymer, or any combination thereof; alternatively, an ethylene/1-butene copolymer, an ethylene/1-hexene copolymer, an ethylene/1-octene copolymer, or any combination thereof; or alternatively, an ethylene/1-hexene copolymer. Consistent with aspects of the present invention, the ethylene polymer composition, the first ethylene polymer component, and the second ethylene polymer component, independently, can have any of the polymer properties listed below and in any combination, unless indicated otherwise.

The ethylene polymer composition can be characterized by a density in a range from about 0.912 to about 0.925 g/cm$^3$. For example, the ethylene polymer composition can have a density in a range from about 0.912 to about 0.922 g/cm$^3$; alternatively, from about 0.912 to about 0.92 g/cm$^3$; or alternatively, from about 0.915 to about 0.925 g/cm$^3$.

The first ethylene polymer component is a lower density component, i.e., the first ethylene polymer component has a lower density than that of the second ethylene polymer component. In one aspect, the first ethylene polymer component can have a density in a range from about 0.89 to about 0.922 g/cm$^3$, while in another aspect, the density can be in a range from about 0.90 to about 0.92 g/cm$^3$, and in yet another aspect, from about 0.905 to about 0.918 g/cm$^3$, and in still another aspect, from about 0.91 to about 0.918 g/cm$^3$. The second ethylene polymer component is a higher density component, i.e., the second ethylene polymer component has a higher density than that of the first ethylene polymer component. In one aspect, for instance, the second ethylene polymer component can have a density in a range from about 0.93 to about 0.972 g/cm$^3$, while in another aspect, the density can be in a range from about 0.932 to about 0.97 g/cm$^3$, and in yet another aspect, from about 0.93 to about 0.958 g/cm$^3$, and in still another aspect, from about 0.945 to about 0.968 g/cm$^3$.

While not being limited thereto, the amount of the second ethylene polymer component often can be in a range from about 4 to about 50 wt. %, from about 4 to about 40 wt. %, from about 4 to about 25 wt. %, or from about 4 to about 15 wt. %, based on the total weight of the first ethylene polymer component and the second ethylene polymer component. In other aspects, the amount of the second ethylene polymer component can be in a range from about 10 to about 40 wt. %, from about 10 to about 25 wt. %, from about 10 to about 20 wt. %, or from about 20 to about 30 wt. %, etc., based on the total weight of the first ethylene polymer component and the second ethylene polymer component.

The respective melt index (MI) of the ethylene polymer composition and the first ethylene polymer component, independently, can be less than or equal to about 3.5 g/10 min, less than or equal to about 2.5 g/10 min, or less than or equal to about 1.5 g/10 min. Typical ranges for the MI of the ethylene polymer composition and/or the first ethylene polymer component can include, but are not limited to, from about 0.3 to about 3 g/10 min, from about 0.3 to about 2 g/10 min, from about 0.5 to about 2.5 g/10 min, from about 0.5 to about 1.8 g/10 min, or from about 0.7 to about 1.7 g/10 min.

The melt index of the second ethylene polymer component generally is not necessarily limited to the same ranges as that of the first ethylene polymer component. For instance, the second ethylene polymer component can have a MI of less than or equal to about 50 g/10 min, less than or equal to about 40 g/10 min, or less than or equal to about 10 g/10 min, with representative non-limiting ranges including from about 0.3 to about 2 g/10 min, from about 0.5 to about 40 g/10 min, from about 5 to about 40 g/10 min, from about 0.4 to about 12 g/10 min, and from about 10 to about 50 g/10 min.

Independently, the ethylene polymer composition, the first ethylene polymer component, and the second ethylene polymer component can have a ratio of HLMI/MI (high load melt index/melt index) in a range from about 10 to about 35, from about 15 to about 35, from about 15 to about 28, from about 15 to about 25, from about 12 to about 30, or from about 12 to about 22, and the like.

Independently, the ethylene polymer composition, the first ethylene polymer component, and the second ethylene polymer component can have a ratio of Mw/Mn, or polydispersity index, in a range from about from about 1.8 to about 4.5, from about 1.8 to about 4, or from about 2 to about 4, in some aspects of this invention, and from about 2.2 to about 4, from about 2 to about 3.8, or from about 2.2 to about 3.8, in other aspects of this invention.

Independently, the ethylene polymer composition, the first ethylene polymer component, and the second ethylene polymer component can have a ratio of Mz/Mw in a range from about 1.6 to about 2.5, or from about 1.7 to about 2.3, in some aspects of this invention, and from about 1.8 to about 2.3, from about 1.8 to about 2.2, or from about 1.7 to about 2.1, in other aspects of this invention.

The respective weight-average molecular weight (Mw) of the ethylene polymer composition and the first ethylene polymer component, independently, can be from about 85 to about 200 kg/mol, or from about 85 to about 150 kg/mol. Other suitable ranges include from about 100 to about 200 kg/mol, from about 100 to about 180 kg/mol, or from about 100 to about 150 kg/mol.

The Mw of the second ethylene polymer component generally is not necessarily limited to the same ranges as that of the first ethylene polymer component. For instance, the second ethylene polymer component can have a Mw from about 85 to about 200 kg/mol, from about 85 to about 160 kg/mol, or from about 100 to about 200 kg/mol, in some aspects of this invention, and from about 40 to about 180 kg/mol, or from about 40 to about 150 kg/mol, in other aspects of this invention.

Consistent with one aspect of this invention, the Mw of the first ethylene polymer component can be greater than the Mw of the second ethylene polymer component. In this aspect, the ratio of the Mw of the first ethylene polymer component to the Mw of the second ethylene polymer component typically can fall within a range from about 1.1:1 to about 2.5:1, from about 1.1:1 to about 2:1, from about 1.1:1 to about 1.8:1, or from about 1.2:1 to about 2.5:1.

Consistent with another aspect of this invention, the Mw of the first ethylene polymer component can be less than the Mw of the second ethylene polymer component. In this aspect, the ratio of the Mw of the first ethylene polymer component to the Mw of the second ethylene polymer component typically can fall within a range from about 0.5:1 to about 0.9:1, from about 0.6:1 to about 0.9:1, from about 0.65:1 to about 0.9:1, or from about 0.7:1 to about 0.9:1.

Consistent with yet another aspect of this invention, the Mw of the first ethylene polymer component can be substantially the same as that of the Mw of the second ethylene polymer component (of similar molecular size). In this aspect, the ratio of the Mw of the first ethylene polymer component to the Mw of the second ethylene polymer component typically can fall within a range from about 0.75:1 to about 1.25:1, from about 0.8:1 to about 1.2:1, from about 0.9:1 to about 1.1:1, or from about 0.8:1 to about 1.1:1.

Independently, the ethylene polymer composition, the first ethylene polymer component, and the second ethylene polymer component can have a unimodal molecular weight distribution (as determined using gel permeation chromatography (GPC) or other suitable analytical technique). In a unimodal molecular weight distribution, there is a single identifiable peak. Often, each of the ethylene polymer composition, the first ethylene polymer component, and the second ethylene polymer component, has a unimodal molecular weight distribution.

Independently, the ethylene polymer composition, the first ethylene polymer component, and the second ethylene polymer component can have a CY-a parameter (at 190° C.) in a range from about 0.25 to about 0.65; alternatively, from about 0.25 to about 0.6; alternatively, from about 0.3 to about 0.65; alternatively, from about 0.35 to about 0.65; alternatively, from about 0.4 to about 0.65; or alternatively, from about 0.45 to about 0.65.

The respective zero-shear viscosity (at 190° C.) of the ethylene polymer composition and the first ethylene polymer component, independently, can be from about 2,500 to about 25,000 Pa-sec, or from about 3,000 to about 25,000 Pa-sec. Other suitable ranges include from about 2,500 to about 20,000 Pa-sec, from about 3,000 to about 20,000 Pa-sec, or from about 4,000 to about 15,000 Pa-sec.

The zero-shear viscosity (at 190° C.) of the second ethylene polymer component generally is not necessarily limited to the same ranges as that of the first ethylene polymer component. For instance, the second ethylene polymer component can have a zero-shear viscosity from about 2,500 to about 25,000 Pa-sec, or from about 5,000 to about 70,000 Pa-sec, in some aspects of this invention, and from about 150 to about 2,500 Pa-sec, or from about 500 to about 5,000 Pa-sec, in other aspects of this invention.

The zero-shear viscosity and the CY-a parameter are determined from viscosity data measured at 190° C. and using the Carreau-Yasuda (CY) empirical model as described herein.

The ethylene polymer composition, the first ethylene polymer component, and the second ethylene polymer component typically have low levels of long chain branches (LCB). For instance, the ethylene polymer composition, the first ethylene polymer component, and the second ethylene polymer component independently, can have less than 10 long chain branches (LCB), less than 8 LCB, less than 5 LCB, or less than 3 LCB, per million total carbon atoms.

Independently, the ethylene polymer composition, the first ethylene polymer component, and the second ethylene polymer component, can have a reverse short chain branching distribution (reverse SCBD; increasing comonomer distribution) or a flat short chain branching distribution (flat SCBD; uniform comonomer distribution). As one of skill in the art would readily recognize, the profile of the SCBD is not applicable when the second ethylene polymer component is an ethylene homopolymer.

A reverse SCBD can be characterized by the number of short chain branches (SCB) per 1000 total carbon atoms of the ethylene polymer at Mw that is greater than at Mn, and/or the number of SCB per 1000 total carbon atoms of the ethylene polymer at Mz that is greater than at Mw, and/or the number of SCB per 1000 total carbon atoms of the ethylene polymer at Mz that is greater than at Mn.

A flat SCBD can be characterized by a slope of a plot of the number of short chain branches (SCB) per 1000 total carbon atoms versus the logarithm of molecular weight of the ethylene polymer (determined via linear regression over the range from D15 to D85) that is in a range from about −0.6 to about 0.6, and/or a percentage of data points deviating from the average short chain branch content by greater than 0.5 short chain branches per 1000 total carbon atoms (determined over the range from D15 to D85) that is less than or equal to about 20%, and/or a percentage of data points deviating from the average short chain branch content by greater than 1 short chain branch per 1000 total carbon atoms (determined over the range from D15 to D85) that is less than or equal to about 10%. Polymers having a flat or uniform SCBD are disclosed, for example, in U.S. Pat. Nos. 9,217,049 and 9,574,031, which are incorporated herein by reference in their entirety.

In accordance with certain aspects of this invention, the ethylene polymer compositions described herein can have a unique ATREF profile. For instance, the ethylene polymer composition can be characterized by an ATREF curve containing at least two peaks (in the 60-110° C. range), with a first peak (a lower temperature peak) at a temperature in a range from about 67 to about 82° C., from about 70 to about 82° C., from about 68 to about 80° C., or from about 70 to about 80° C. Additionally or alternatively, the ethylene polymer composition can be characterized by an ATREF curve containing at least two peaks (in the 60-110° C. range), with a second peak (a higher temperature peak) at a temperature in a range from about 92 to about 105° C., from about 94 to about 105° C., from about 95 to about 105° C., or from about 96 to about 105° C.

Additionally or alternatively, the ethylene polymer composition can be characterized by an ATREF curve containing at least two peaks in the temperature range from about 60 to about 110° C., and the difference between the temperatures of the two peaks (ΔT) can be in a range from about 17 to about 32° C., from about 18 to about 32° C., or from about 18 to about 30° C. In these and other aspects, the peak ATREF temperature (temperature of the highest peak on the ATREF curve) can be either the lower temperature peak or the higher temperature peak. In further aspects, in addition to the aforementioned lower and higher temperature peaks, there are no other significant peaks on the ATREF curve above a dW/dT of 1 in height (plot of dW/dT vs. T; normalized to an area equal to 1).

Consistent with aspects of this invention, the first ethylene polymer component and the second ethylene polymer component, independently, can be produced using a zirconium-based metallocene catalyst system. For example, the catalyst system can comprise a zirconium-containing metallocene compound (bridged or unbridged), an activator, and an optional co-catalyst. In such aspects, the first ethylene polymer component and the second ethylene polymer component are not produced using a hafnium-based and/or a titanium-based catalyst system.

Further, and independently, the ethylene polymer composition, the first ethylene polymer component, and the second ethylene polymer component, can contain no measurable amount of hafnium or titanium (catalyst residue), i.e., less than 0.1 ppm by weight. In some aspects, the ethylene polymer composition, the first ethylene polymer component, and the second ethylene polymer component, independently, can contain less than 0.08 ppm, less than 0.05 ppm, or less than 0.03 ppm, of either hafnium or titanium.

In an aspect, the ethylene polymer composition described herein can be a reactor product (e.g., a single reactor product) containing the first ethylene polymer component and the second ethylene polymer component, for example, not a post-reactor blend of the first ethylene polymer component and the second ethylene polymer component. However, in another aspect of this invention, the ethylene polymer composition described herein can be blend or mixture (e.g., a post-reactor blend) containing the first ethylene polymer component and the second ethylene polymer component. The ethylene polymer composition can be in any suitable form, such as powder, fluff, or pellets.

Typically, a large majority or substantially all of the ethylene polymer composition is the first ethylene polymer component and the second ethylene polymer component. In an aspect, the total amount of the first ethylene polymer component and the second ethylene polymer component in the ethylene polymer composition can be at least about 75 wt. %, at least about 85 wt. %, at least about 90 wt. %, at least about 95 wt. %, at least about 98 wt. %, or at least about 99 wt. %, and this is based on the total weight of the composition. As one of skill in the art would readily recognize, the ethylene polymer composition can further one or more suitable additives, such as an antioxidant, an acid scavenger, an antiblock additive, a slip additive, a colorant, a filler, a polymer processing aid, a UV additive, and the like, as well as combinations thereof. Further, as one of skill in the would readily recognize, the ethylene polymer composition can further contain other polymer components—in addition to the first ethylene polymer component and the second ethylene polymer component—and illustrative and non-limiting polymer components can include low density polyethylene (LDPE), ethylene vinyl acetate (EVA), and the like. In particular aspects of this invention, the only polymer components of the ethylene polymer composition are the first ethylene polymer component and the second ethylene polymer component.

An illustrative and non-limiting example of an ethylene polymer composition of the present invention can contain (i) a homogeneously-branched first ethylene polymer component, and (ii) a homogeneously-branched second ethylene polymer component of higher density than the first ethylene polymer component. The amount of the second ethylene polymer component can be in a range from about 4 to about 50 wt. %, based on the total weight of the first ethylene polymer component and the second ethylene polymer component. Moreover, the composition can be characterized by a density in a range from about 0.912 to about 0.925 g/cm$^3$, a ratio of Mw/Mn in a range from about 1.8 to about 4.5, a melt index less than or equal to about 3.5 g/10 min, a CY-a parameter in a range from about 0.25 to about 0.65, and an ATREF curve containing at least two peaks, with a first peak at a temperature in a range from about 67 to about 82° C., and a second peak at a temperature in a range from about 92 to about 105° C. This illustrative and non-limiting example of an ethylene polymer composition consistent with the present invention also can have any of the polymer properties and features listed herein and in any combination, unless indicated otherwise.

Articles and Products

Articles of manufacture can be produced from, and/or can comprise, the ethylene polymer compositions of this invention and, accordingly, are encompassed herein. For example, articles that can comprise ethylene polymer compositions of this invention can include, but are not limited to, an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymer compositions in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety. In some aspects of this invention, the article of manufacture can comprise (or can be produced from) any of ethylene polymer compositions described herein, and the article of manufacture can be or can comprise a film.

In some aspects, the article produced from and/or comprising an ethylene polymer composition of this invention is a film product. For instance, the film can be a blown film or a cast film that is produced from and/or comprises any of the ethylene polymer compositions disclosed herein. Such films also can contain one or more additives, non-limiting examples of which can include an antioxidant, an acid scavenger, an antiblock additive, a slip additive, a colorant, a filler, a processing aid, a UV inhibitor, and the like, as well as combinations thereof.

Also contemplated herein is a method for making a film (e.g., a blown film, a cast film, etc.) comprising any ethylene polymer composition disclosed herein. For instance, the method can comprise melt processing the ethylene polymer composition through a die to form the film. Suitably, the die can be configured based on the film to be produced, for example, an annular blown film die to produce a blown film, a slot or cast film die to produce a cast film, and so forth.

Moreover, any suitable means of melt processing can be employed, although extrusion typically can be utilized. As above, additives can be combined with the polymer composition in the melt processing step (extrusion step), such as antioxidants, acid scavengers, antiblock additives, slip additives, colorants, fillers, processing aids, UV inhibitors, and the like, as well as combinations thereof.

Films disclosed herein, whether cast or blown, can be any thickness that is suitable for the particular end-use application, and often, the average film thickness can be in a range from about 0.25 to about 25 mils, or from about 0.4 to about 20 mils. For certain film applications, typical average thicknesses can be in a range from about 0.5 to about 8 mils, from about 0.8 to about 5 mils, from about 0.7 to about 2 mils, or from about 0.7 to about 1.5 mils.

In an aspect and unexpectedly, the films disclosed herein (e.g., blown films) can have excellent impact strength, tear resistance, and optical properties, despite the presence of the second ethylene polymer component (the higher density component). For instance, a film consistent with aspects of this invention can have a dart impact strength greater than or equal to about 300 g/mil. In some aspects, the film can have a dart impact greater than or equal to about 400 g/mil, greater than or equal to about 500 g/mil, greater than or equal to about 700 g/mil, greater than or equal to about 900 g/mil, greater than or equal to about 1200 g/mil, or greater than or equal to about 1400 g/mil, and often can range up to about 1500-2000 g/mil or more. For many film applications, the upper limit on dart impact is not determined, so long as the dart impact exceeds a particular minimal value or threshold.

The film also can be characterized by its Spencer impact strength. Spencer impact strengths often can be in a range from about 0.4 to about 2 J/mil, or from about 0.5 to about 1.5 J/mil, but are not limited thereto.

In another aspect, blown or cast films described herein can be characterized by the MD (or TD) Elmendorf tear strength. Suitable ranges for the MD tear strength can include, but are not limited to, from about 100 to about 500 g/mil, from about 150 to about 500 g/mil, from about 100 to about 450 g/mil, from about 125 to about 425 g/mil, from about 150 to about 450 g/mil, from about 200 to about 450 g/mil, or from about 225 to about 475 g/mil. Suitable ranges for the TD tear strength can include, but are not limited to, from about 200 to about 800 g/mil, from about 250 to about 800 g/mil, from about 250 to about 700 g/mil, or from about 300 to about 600 g/mil.

Advantageously, and unexpectedly, the film products of this invention have a good balance of tear properties, as generally quantified by the ratio of MD Elmendorf tear strength to TD Elmendorf tear strength (MD:TD). Often, this MD:TD ratio falls in a range from about 0.3:1 to about 0.8:1, from about 0.4:1 to about 0.8:1, from about 0.3:1 to about 0.75:1, from about 0.4:1 to about 0.75:1, or from about 0.5:1 to about 0.75:1.

In an aspect, film products of this invention (e.g., nominal 1-mil films) also can be characterized by very good optical properties, such as low haze and high clarity, e.g., particularly in the absence of any additives that might impact such measurements, such as slip and antiblock additives. Representative blown and cast films described herein can have a film haze of less than or equal to about 12%, less than or equal to about 10%, in a range from about 2 to about 9%, or in a range from about 3 to about 8%, and often the film haze can range down to 1-3%. Similarly, the clarity of the films contemplated herein often can be at least about 95%, at least about 98%, at least about 98.5%, or at least about 99%.

An illustrative and non-limiting example of a film product (produced from or comprising the ethylene polymer composition) consistent with the present invention can have a MD Elmendorf tear strength in a range from about 100 to about 500 g/mil (or from about 150 to about 450 g/mil), and a ratio of MD Elmendorf tear strength to TD Elmendorf tear strength (MD:TD) in a range from about 0.3:1 to about 0.8:1 (or from about 0.4:1 to about 0.75:1). This illustrative and non-limiting example of a film product consistent with the present invention also can have any of the polymer and film properties and features listed herein and in any combination, unless indicated otherwise.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight, and high load melt index (HLMI, g/10 min) was determined in accordance with ASTM D1238 at 190° C. with a 21,600 gram weight. Density was determined in grams per cubic centimeter (g/cm$^3$) on a compression molded sample, cooled at 15° C. per hour, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 200 μL was used. The integral calibration method was used to deduce molecular weights and molecular weight distributions using a Chevron Phillips Chemical Company's HDPE polyethylene resin, MARLEX® BHB5003, as the standard. The integral table of the standard was predetermined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (w) data were then curve fitted using the modified three parameter Carreau-Yasuda (CY) empirical model to obtain the zero-shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta^0}{[1 + (\tau_\eta \omega)^a]^{(1-n)/a}},$$

wherein: $|\eta^*(\omega)|$=magnitude of complex shear viscosity;
$\eta_0$=zero-shear viscosity;
$\tau_\eta$=viscous relaxation time (Tau($\eta$));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, Fluid Mechanics, 2nd Edition, John Wiley & Sons (1987); each of which is incorporated herein by reference in its entirety.

Differential Scanning calorimetry (DSC) was performed at a heating rate of 20° C./min, as described in ASTM D3418 (2nd heat, peak temperatures in ° C.).

The ATREF procedure was as follows. Forty mg of the polymer sample and 20 mL of 1,2,4-trichlorobenzene (TCB) were sequentially charged into a vessel on a PolyChar TREF 200+instrument. After dissolving the polymer, an aliquot (500 microliters) of the polymer solution was loaded on the column (stainless steel shots) at 150° C. and cooled at 0.5° C./min to 25° C. Then, the elution was begun with a 0.5 mL/min TCB flow rate and heating at 1° C./min up to 120° C., and analyzing with an IR detector. The peak ATREF temperature is the location, in temperature, of the highest point of the ATREF curve.

The long chain branches (LCB) per 1,000,000 total carbon atoms were calculated using the method of Janzen and Colby (*J. Mol. Struct.*, 485/486, 569-584 (1999)), from values of zero shear viscosity, $\eta_o$ (determined from the Carreau-Yasuda model, described hereinabove), and measured values of Mw obtained using a Dawn EOS multiangle light scattering detector (Wyatt). See also U.S. Pat. No. 8,114,946; J. Phys. Chem. 1980, 84, 649; and Y. Yu, D. C. Rohlfing, G. R Hawley, and P. J. DesLauriers, *Polymer Preprints*, 44, 49-50 (2003). These references are incorporated herein by reference in their entirety.

Short chain branch content and short chain branching distribution (SCBD) across the molecular weight distribution can be determined via an IR5-detected GPC system (IR5-GPC), wherein the GPC system is a PL220 GPC/SEC system (Polymer Labs, an Agilent company) equipped with three Styragel HMW-6E columns (Waters, Mass.) for polymer separation. A thermoelectric-cooled IR5 MCT detector (IR5) (Polymer Char, Spain) is connected to the GPC columns via a hot-transfer line. Chromatographic data is obtained from two output ports of the IR5 detector. First, the analog signal goes from the analog output port to a digitizer before connecting to Computer "A" for molecular weight determinations via the Cirrus software (Polymer Labs, now an Agilent Company) and the integral calibration method using a HDPE Marlex™ BHB5003 resin (Chevron Phillips Chemical) as the molecular weight standard. The digital signals, on the other hand, go via a USB cable directly to Computer "B" where they are collected by a LabView data collection software provided by Polymer Char. Chromatographic conditions can be set as follows: column oven temperature of 145° C.; flowrate of 1 mL/min; injection volume of 0.4 mL; and polymer concentration of about 2 mg/mL, depending on sample molecular weight. The temperatures for both the hot-transfer line and IR5 detector sample cell are set at 150° C., while the temperature of the electronics of the IR5 detector is set at 60° C. Short chain branching content can be determined via an in-house method using the intensity ratio of $CH_3$ ($I_{CH3}$) to $CH_2$ ($I_{CH2}$) coupled with a calibration curve. The calibration curve is a plot of SCB content ($x_{SCB}$) as a function of the intensity ratio of $I_{CH3}/I_{CH2}$. To obtain a calibration curve, a group of polyethylene resins (no less than 5) of SCB level ranging from zero to ca. 32 SCB/1,000 total carbons (SCB Standards) are used. All these SCB Standards have known SCB levels and flat SCBD profiles pre-determined separately by NMR and the solvent-gradient fractionation coupled with NMR (SGF-NMR) methods. Using SCB calibration curves thus established, profiles of short chain branching distribution across the molecular weight distribution are obtained for resins fractionated by the IR5-GPC system under exactly the same chromatographic conditions as for these SCB standards. A relationship between the intensity ratio and the elution volume is converted into SCB distribution as a function of MWD using a predetermined SCB calibration curve (i.e., intensity ratio of $I_{CH4}/I_{CH2}$ vs. SCB content) and MW calibration curve (i.e., molecular weight vs. elution time) to convert the intensity ratio of $I_{CH3}/I_{CH2}$ and the elution time into SCB content and the molecular weight, respectively.

Although not tested, it is expected that the polymer blend compositions discussed below do not have a decreasing comonomer distribution, i.e., the polymer blend compositions have either a reverse short chain branching distribution (increasing comonomer distribution) or a flat short chain branching distribution (uniform comonomer distribution).

Dart impact strength (g/mil) was measured in accordance with ASTM D1709 (method A). Machine direction (MD) and transverse direction (TD) Elmendorf tear strengths (g/mil) were measured on a Testing Machines tear tester (Model 83-11-00) in accordance with ASTM D1922. Spencer Impact (J/mil) was determined in accordance with ASTM D3420.

Film haze (%) was determined in accordance with ASTM D1003, and film clarity (%) was determined in accordance with ASTM 105.

Metals content, such as the amount of catalyst residue in the polymer composition or film, was determined by ICP analysis on a PerkinElmer Optima 8300 instrument. Polymer samples were ashed in a Thermolyne furnace with sulfuric acid overnight, followed by acid digestion in a HotBlock with HCl and $HNO_3$ (3:1 v:v).

Examples 1-24

Low density polymer components (ethylene/1-hexene copolymers) were melt blended with high density polymer components (ethylene/1-hexene copolymers or ethylene homopolymers) to produce Blend Examples B1-B15. The properties of the respective low density polymer components (LD 1 to LD 5) and high density polymer components (HD 1 to HD 3) are summarized in Table I. These polymer components were produced using zirconium-based metallocene catalyst systems. The relative amounts of the low and high density components used in Blend Examples B1-B15, and the properties of the blend compositions, are summarized in Table II. The blend compositions were produced using a Prism twin screw extruder with a 16" screw length. The heating and screw speed were adjusted to obtain a melt temperature of 275° C. for the polymer strand (Zone 1=193° C., Zone 2=204° C., Zone 3=204° C., Zone 4=204° C., Zone 5=204° C., Screw RPM=150). The polymer strand was cooled in a water bath, pelletized, and then dried to form the polymer compositions of Blend Examples B1-B15.

Cast film samples at a 2-mil thickness (50 microns) were produced from Blend Examples B1-B15 and low density components LD 1 to LD 5. The cast film samples were made on a laboratory-scale cast film line using typical linear low density polyethylene conditions (LLDPE) as follows: 127 mm die width, 0.508 mm die gap, 16 mm diameter single-screw extruder (L/D=24-27), 0.5 kg/hr output rate, and 204° C. barrel and die set temperatures. Cooling was accomplished with chill roll at about 23° C. These particular processing conditions were chosen because the cast film properties so obtained are typically representative of those obtained from larger, commercial scale film casting conditions.

Table III summarizes the MD and TD Elmendorf tear strengths of the cast film samples, and the ratios of MD:TD tear strength. Unexpectedly, the addition of the higher density component to the low density component resulted in an increase in the MD tear strength in all instances (compare B1-B3 versus LD 1, B4-B6 versus LD 2, and so forth). Further, the MD:TD tear strength ratio generally increased for Blend Examples B1-B15 (0.3-0.6 range), as compared to the corresponding LD 1 to LD 5 low density components.

Low density polymer components (ethylene/1-hexene copolymers) were melt blended with a single high density polymer component (HD 1) to produce Blend Examples B16-B19. The blend compositions were produced using a ZSK-40 twin screw extruder with a 30" screw length. The heating and screw speed were adjusted to obtain a melt temperature of 275° C. for the polymer strand (Zone 1=250° C., Zone 2=245° C., Zone 3=245° C., Zone 4=230° C., Screw RPM=75). The relative amounts of the low and high density components used in Blend Examples B16-B19, and the properties of the blend compositions, are summarized in Table IV.

Figure 1:
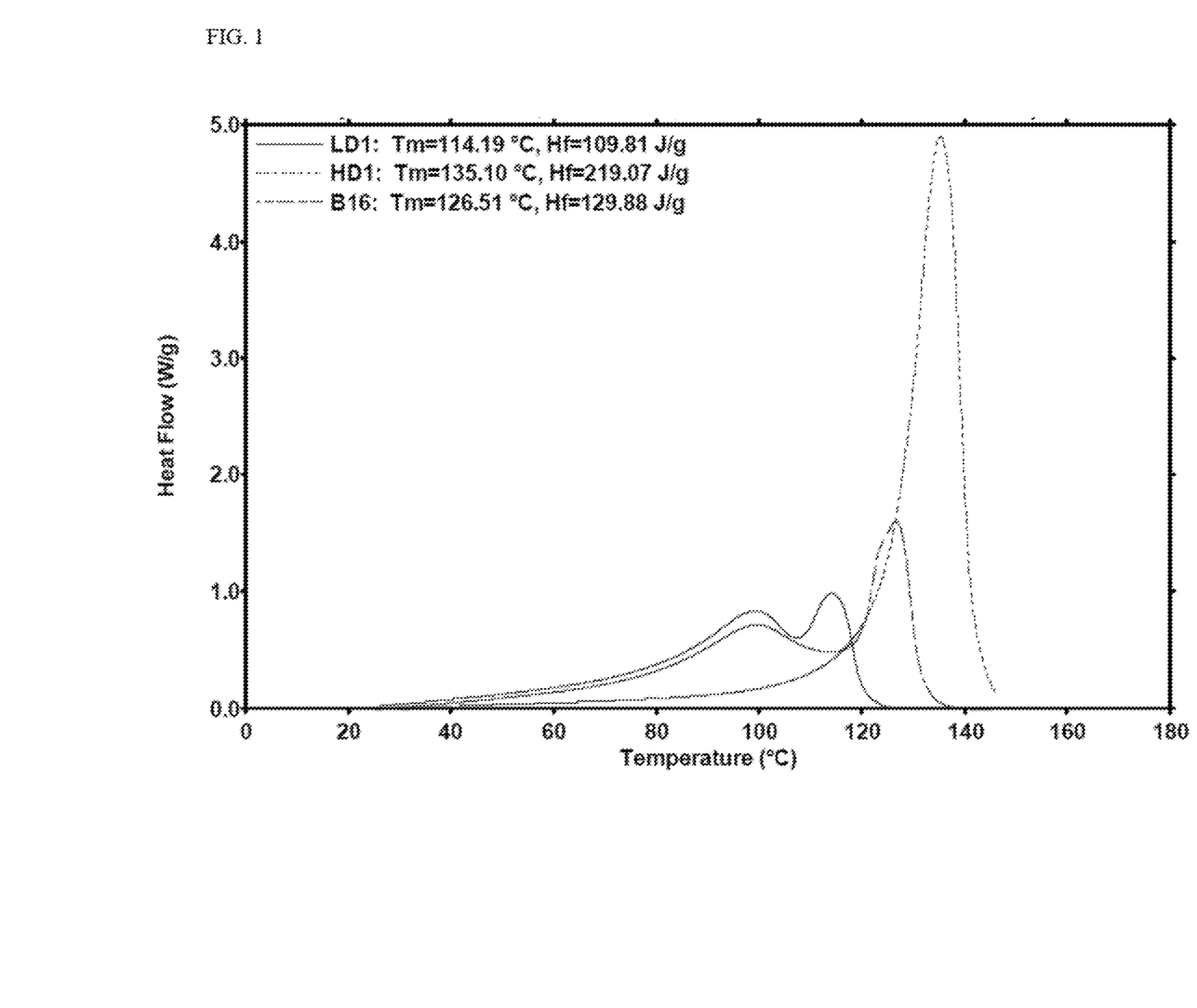
FIG. 1 presents a plot of the second heat DSC curves for low density component LD 1, high density component HD 1, and ethylene polymer composition B16.

FIG. 1 illustrates the second heat DSC curves for low density component LD 1, high density component HD 1, and ethylene polymer composition B16. The low density component LD 1 and the ethylene polymer composition B16 both have two peaks on their respective DSC curves (and are representative of the other low density components and ethylene polymer compositions of this invention), while the high density component HD 1 has only a single peak (and is representative of the other high density components of this invention).

Blown film samples at a 1-mil thickness (25 microns) were produced from Blend Examples B16-B19 and low density components LD 1 to LD 5. The blown film samples were made on a laboratory-scale blown film line using typical linear low density polyethylene conditions (LLDPE) as follows: 100 mm die diameter, 1.5 mm die gap, 37.5 mm diameter single-screw extruder fitted with a barrier screw with a Maddock mixing section at the end (L/D=24, 2.2:1 compression ratio), 27 kg/hr output rate, 2.5:1 blow-up ratio (BUR), "in-pocket" bubble with a "frost line height" (FLH) of about 28 cm, and 190° C. barrel and die set temperatures. Cooling was accomplished with a Dual Lip air ring using ambient (laboratory) air at about 25° C. These particular processing conditions were chosen because the blown film properties so obtained are typically representative of those obtained from larger, commercial scale film blowing conditions.

Table V summarizes the dart impact, Spencer impact, MD and TD Elmendorf tear strength, ratio of MD:TD tear strength, and optical properties of the blown film samples. Similar to Table III, and unexpectedly, the addition of the high density component to the low density component resulted in an increase in the MD tear strength in all instances (compare B16 versus LD 1, B17 versus LD 2, and so forth). Further, the MD:TD tear strength ratio generally increased for Blend Examples B16-B19 (0.36-0.72 range), as compared to the corresponding LD 1 to LD 4 low density components. Also beneficially, the addition of the high density component to the low density component did not significantly decrease the dart impact, spencer impact, film haze, or film clarity. Blend Examples B16-B19 retained excellent impact strength and optical properties, but with an increase in MD tear resistance (and are representative of the ethylene polymer compositions of this invention).

The representative blown film samples of Blend Examples B16-B19 were analyzed for residual metals, and the zirconium content was in the 0.2-0.8 ppm range (by weight). The titanium content and hafnium content were less than 0.03 ppm, which was below the level of detection (no measurable amount).

A single low density polymer component (ethylene/1-hexene copolymer) was melt blended with high density homopolymer components to produce Blend Examples B20-B24, in the same manner as Blend Examples B1-B15. The properties of the respective low density polymer component (LD 6) and high density polymer components (HD 4 to HD 8) are summarized in Table VI. These polymer components were produced using zirconium-based metallocene catalyst systems. The relative amounts of the low and high density components used in Blend Examples B20-B24, and the properties of the blend compositions, are summarized in Table VII and Table VIII As shown in the tables, the high density polymer components (HD 4 to HD 8) covered a large range of melt index (from 0.1 to 39 g/10 min) and molecular weight (Mw from 49 to 223 kg/mol). However, the blend compositions of Examples B20-B24 had a much narrower range of polymer attributes (density, MI, HLMI, HLMI/MI, Mw, Mw/Mn, Mz/Mw, $\eta_0$, and CY-a).

Cast film samples at a 2-mil thickness (50 microns) were produced from Blend Examples B20-B24 and low density component LD 6, in the same manner as Blend Examples B1-B15. Table IX summarizes the MD and TD Elmendorf tear strengths of the cast film samples, and the ratio of MD:TD tear strength. With the exception of Example B20 (which used the highest molecular weight high density component), the addition of the high density component to the low density component resulted in a significant increase in the MD tear strength (increases of 50-75%). Blend Example B22 had the best tear resistance, and utilized the high density component that was most similar in molecular weight to that of the low density component. However, higher melt flow (lower Mw) high density components also resulted in significant increases in tear strength. Further, despite the films being produced using a cast film process, the MD:TD tear strength ratios for Blend Examples B21-B24 ranged from 0.43 to 0.47.

Figure 2:
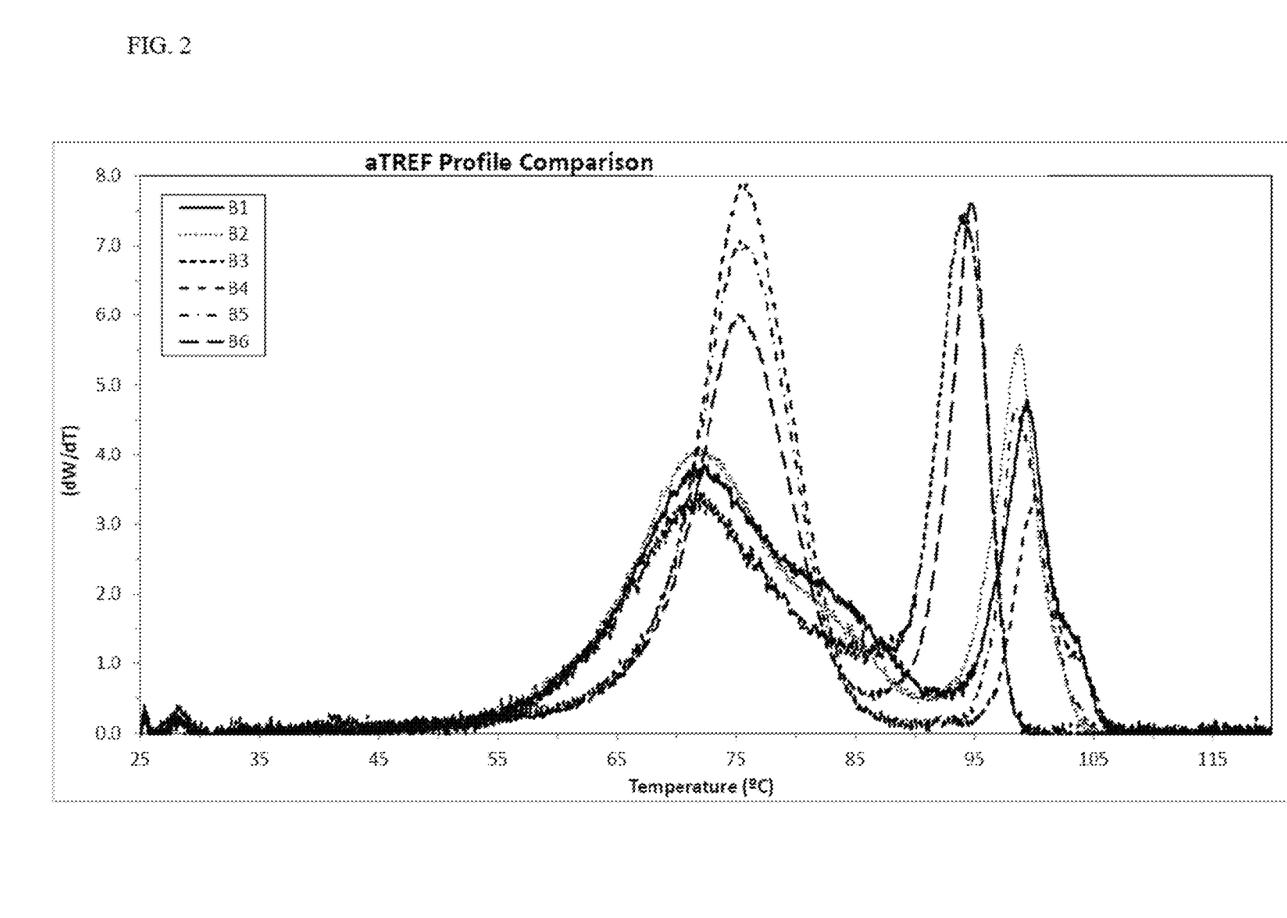
FIG. 2 presents a plot of the ATREF profiles of the ethylene polymer compositions of Examples B1-B6.
Figure 3:
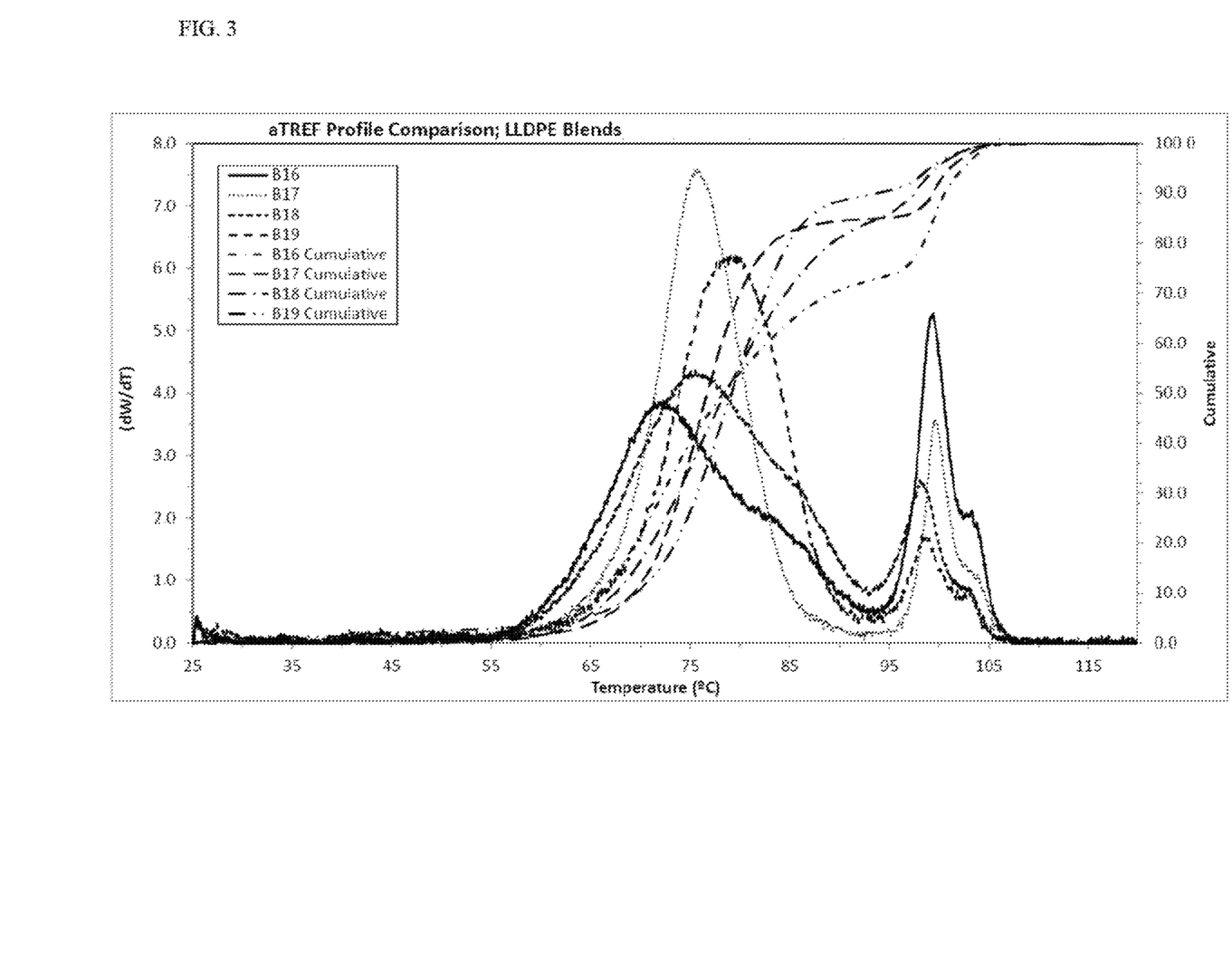
FIG. 3 presents a plot of the ATREF profiles of the ethylene polymer compositions of Examples B16-B19.

FIG. 2 illustrates the ATREF profiles of the ethylene polymer compositions of Blend Examples B1-B6, while FIG. 3 illustrates the ATREF profiles of the ethylene polymer compositions of Blend Examples B16-B19, and these ATREF profiles are representative of the ethylene polymer compositions of this invention. These ATREF curves generally contain two peaks in the 60-110° C. range, with the first peak (lower temperature peak) at a temperature in the 70-80° C. range, and with the second peak (higher temperature peak) at a temperature in the 94-105° C. range. The peak temperatures for Examples B16-B19 are summarized in Table X.

Figure 4:
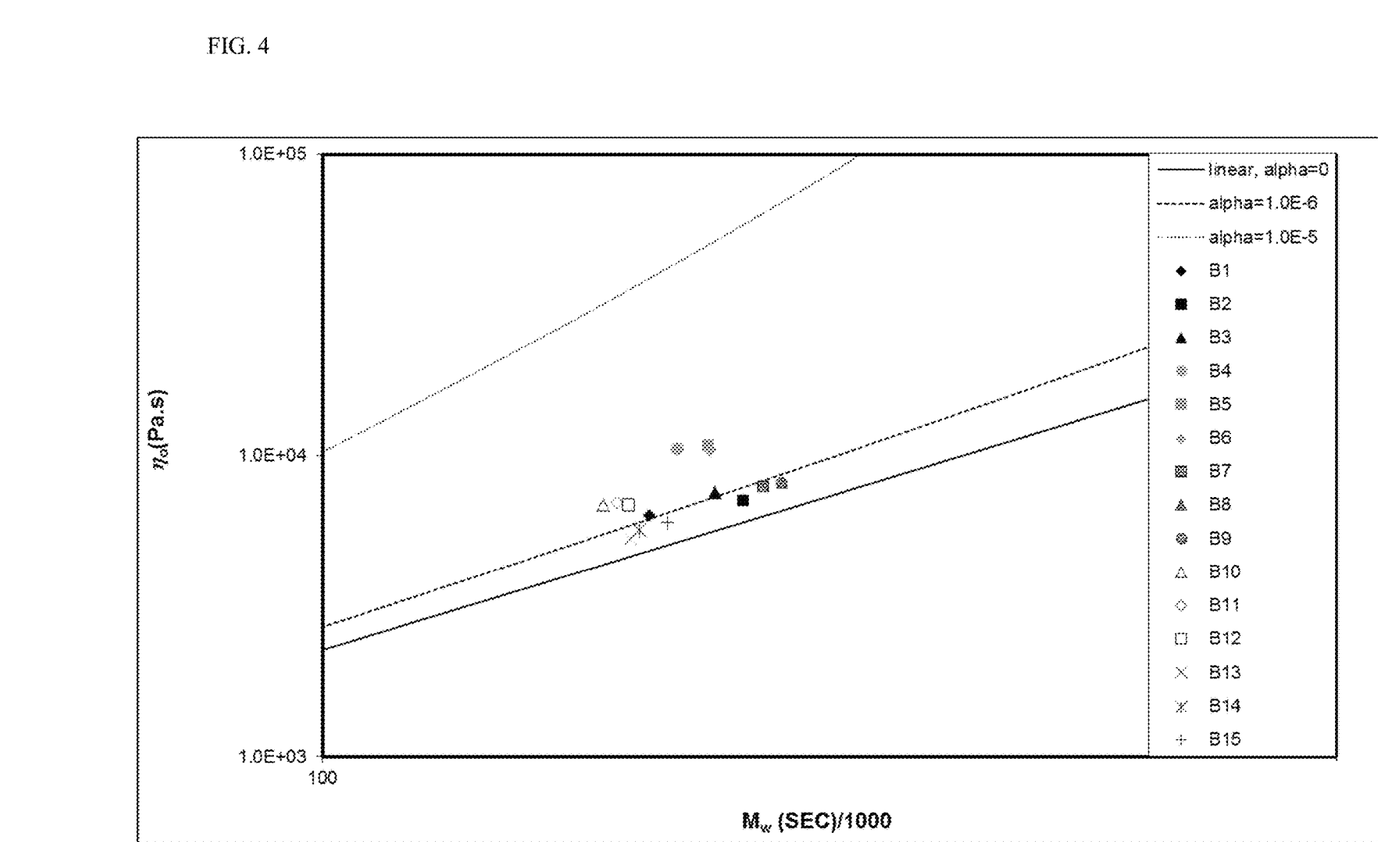
FIG. 4 presents a plot of the logarithm of the zero-shear viscosity versus the logarithm of weight-average molecular weight (Mw) for the ethylene polymer compositions of Examples B1-B15.

FIG. 4 presents an "Arnett plot," wherein the log of the zero-shear viscosity is plotted against the log of the weight-average molecular weight, for Blend Examples B1-B15, and is representative of the ethylene polymer compositions of this invention. When each point is compared to the Janzen-Colby grid lines, the average number of long chain branches (LCB) in the polymer can be determined (Alpha is the average number of LCB per carbon atom). FIG. 4 shows the unexpectedly low levels of LCB of the polymer compositions of this invention, with less than 10 LCB per 1,000,000 total carbon atoms, and in some cases, less than 1-3 LCB per 1,000,000 total carbon atoms.

Thus, the polymer compositions disclosed herein offer a beneficial combination of density, molecular weight, melt flow, and ATREF properties, resulting in film products with excellent impact resistance and optical properties, but with improved tear resistance, particularly in the machine direction, as quantified by the MD Elmendorf tear strength.

TABLE I

| Polymer Component | Density (g/cm³) | MI (g/10 min) | Mw (kg/mol) | Mw/Mn | $\eta_0$ (Pa-sec) | CY-a |
|---|---|---|---|---|---|---|
| Low Density Components |||||||
| LD 1 | 0.911 | 1.03 | 125 | 2.23 | 7,150 | 0.605 |
| LD 2 | 0.912 | 1.01 | 122 | 3.28 | 12,000 | 0.311 |
| LD 3 | 0.913 | 0.90 | 128 | 2.62 | 8,250 | 0.601 |
| LD 4 | 0.917 | 1.52 | 111 | 3.82 | 6,950 | 0.379 |
| LD 5 | 0.913 | 1.40 | 114 | 2.10 | 4,350 | 0.604 |
| High Density Components |||||||
| HD 1 | 0.958 | 1.04 | 135 | 2.98 | 6,700 | 0.564 |
| HD 2 | 0.947 | 0.86 | 145 | 2.63 | 9,380 | 0.512 |
| HD 3 | 0.932 | 0.90 | 137 | 2.57 | 5,670 | 0.465 |

TABLE II

| Blend Example | Low Density Component | LD content (wt. %) | High Density Component | HD content (wt. %) | Density (g/cm³) | Mw (kg/mol) | Mw/Mn |
|---|---|---|---|---|---|---|---|
| B1 | LD 1 | 79.4 | HD 1 | 20.6 | 0.920 | 125 | 2.59 |
| B2 | LD 1 | 74.0 | HD 2 | 26.0 | 0.920 | 133 | 2.55 |
| B3 | LD 1 | 60.1 | HD 3 | 39.9 | 0.920 | 131 | 2.59 |
| B4 | LD 2 | 87.6 | HD 1 | 12.4 | 0.917 | 127 | 3.36 |
| B5 | LD 2 | 84.0 | HD 2 | 16.0 | 0.919 | 130 | 3.39 |
| B6 | LD 2 | 73.5 | HD 3 | 26.5 | 0.918 | 130 | 3.35 |
| B7 | LD 3 | 90.4 | HD 1 | 9.6 | 0.916 | 135 | 2.70 |
| B8 | LD 3 | 87.4 | HD 2 | 12.6 | 0.917 | 137 | 2.76 |
| B9 | LD 3 | 78.6 | HD 3 | 21.4 | 0.917 | 137 | 2.64 |
| B10 | LD 4 | 93.8 | HD 1 | 6.2 | 0.920 | 121 | 3.99 |
| B11 | LD 4 | 91.8 | HD 2 | 8.2 | 0.921 | 122 | 3.89 |
| B12 | LD 4 | 85.5 | HD 3 | 14.5 | 0.920 | 123 | 3.73 |
| B13 | LD 5 | 95.0 | HD 1 | 5.0 | 0.915 | 124 | 2.50 |
| B14 | LD 5 | 93.3 | HD 2 | 6.7 | 0.915 | 124 | 2.53 |
| B15 | LD 5 | 88.0 | HD 3 | 12.0 | 0.918 | 127 | 2.50 |

TABLE III

| Component or Blend | MD Tear (g/mil) | TD Tear (g/mil) | Ratio of MD/TD |
|---|---|---|---|
| B1 | 308 | 579 | 0.53 |
| B2 | 287 | 532 | 0.54 |
| B3 | 271 | 562 | 0.48 |
| LD 1 | 172 | 418 | 0.41 |
| B4 | 179 | 487 | 0.37 |
| B5 | 155 | 486 | 0.32 |
| B6 | 144 | 485 | 0.30 |
| LD 2 | 109 | 355 | 0.31 |
| B7 | 227 | 437 | 0.52 |
| B8 | 214 | 510 | 0.42 |
| B9 | 212 | 421 | 0.50 |
| LD 3 | 112 | 445 | 0.25 |
| B10 | 213 | 490 | 0.43 |
| B11 | 224 | 492 | 0.46 |
| B12 | 230 | 510 | 0.45 |
| LD 4 | 140 | 519 | 0.27 |
| B13 | 255 | 435 | 0.59 |
| B14 | 215 | 382 | 0.56 |
| B15 | 227 | 449 | 0.51 |
| LD 5 | 188 | 371 | 0.51 |

TABLE IV

| Blend Example | Low Density Component | LD content (wt. %) | High Density Component | HD content (wt. %) | Density (g/cm³) | MI (g/10 min) | Mw (kg/mol) | Mw/Mn |
|---|---|---|---|---|---|---|---|---|
| B16 | LD 1 | 79 | HD 1 | 21 | 0.920 | 1.05 | 121 | 2.41 |
| B17 | LD 2 | 88 | HD 1 | 12 | 0.917 | 1.03 | 118 | 3.18 |
| B18 | LD 3 | 90 | HD 1 | 10 | 0.916 | 0.89 | 125 | 2.35 |
| B19 | LD 4 | 96 | HD 1 | 4 | 0.919 | 1.45 | 110 | 3.94 |

TABLE V

| Component or Blend | Dart Impact (g/mil) | Spencer Impact (J/mil) | MD Tear (g/mil) | TD Tear (g/mil) | Ratio of MD/TD | Haze (%) | Clarity (%) |
|---|---|---|---|---|---|---|---|
| LD 5 | >1400 | 1.72 | 228 | 350 | 0.65 | 4.7 | 98.9 |
| LD 1 | >1400 | 1.68 | 202 | 335 | 0.60 | 3.2 | 99.2 |
| B16 | >1400 | 1.16 | 349 | 484 | 0.72 | 7.2 | 98.6 |
| LD 2 | >1400 | No Break | 158 | 349 | 0.45 | 4.4 | — |
| B17 | 898 | 0.69 | 177 | 488 | 0.36 | 6.8 | 98.8 |
| LD 3 | >1400 | 1.67 | 223 | 350 | 0.64 | 3.0 | 99.3 |
| B18 | >1400 | 1.34 | 293 | 435 | 0.67 | 5.4 | 99.0 |
| LD 4 | 904 | 0.88 | 197 | 449 | 0.44 | 5.4 | 98.8 |
| B19 | 712 | 0.56 | 272 | 499 | 0.55 | 6.8 | 98.8 |

TABLE VI

| Component | MI (g/10 min) | Density (g/cm3) | Mn (kg/mol) | Mw (kg/mol) | Mw/Mn | Mz/Mw | $\eta_0$ (Pa-sec) | CY-a |
|---|---|---|---|---|---|---|---|---|
| HD 4 | 0.12 | 0.950 | 90 | 223 | 2.48 | 1.79 | 58,000 | 0.553 |
| HD 5 | 0.50 | 0.955 | 60 | 154 | 2.57 | 1.83 | 13,400 | 0.572 |
| HD 6 | 1.04 | 0.957 | 49 | 128 | 2.62 | 1.89 | 6,830 | 0.579 |
| HD 7 | 38.6 | 0.971 | 13 | 49 | 3.71 | 2.34 | 192 | 0.466 |
| HD 8 | 10.3 | 0.966 | 19 | 68 | 3.59 | 2.15 | 680 | 0.567 |
| LD 6 | 1.19 | 0.911 | 50 | 117 | 2.31 | 1.75 | 4,210 | 0.560 |

TABLE VII

| Blend Example | Low Density Component | High Density Component | Mw of HD Component (kg/mol) | LD content (wt. %) | HD content (wt. %) |
|---|---|---|---|---|---|
| B20 | LD 6 | HD 4 | 223 | 81.7 | 18.3 |
| B21 | LD 6 | HD 5 | 154 | 83.6 | 16.4 |
| B22 | LD 6 | HD 6 | 128 | 84.5 | 15.5 |
| B23 | LD 6 | HD 8 | 68 | 86.8 | 13.2 |
| B24 | LD 6 | HD 7 | 49 | 87.8 | 12.2 |

TABLE VIII

| Blend Example | Low Density (g/cm³) | High Density (g/10 min) | HLMI (g/10 min) | HLMI/MI | Mw (kg/mol) | Mw/Mn | Mz/Mw | $\eta_0$ (Pa-sec) | CY-a |
|---|---|---|---|---|---|---|---|---|---|
| B20 | 0.918 | 0.74 | 12.9 | 17.4 | 137 | 2.48 | 1.91 | 10,800 | 0.535 |
| B21 | 0.917 | 1.09 | 18.2 | 16.7 | 120 | 2.35 | 1.73 | 7,000 | 0.602 |
| B22 | 0.917 | 1.20 | 20.2 | 16.9 | 116 | 2.46 | 1.74 | 6,200 | 0.608 |
| B23 | 0.917 | 1.61 | 28.7 | 17.8 | 104 | 2.68 | 1.74 | 4,700 | 0.618 |
| B24 | 0.918 | 1.59 | 28.1 | 17.7 | 102 | 2.82 | 1.79 | 4,700 | 0.617 |

TABLE IX

| Component or Blend | High Density Component | Mw of HD Component (kg/mol) | MD Tear (g/mil) | TD Tear (g/mil) | Ratio of MD/TD |
|---|---|---|---|---|---|
| B20 | HD 4 | 223 | 155 | 674 | 0.23 |
| B21 | HD 5 | 154 | 275 | 642 | 0.43 |
| B22 | HD 6 | 128 | 300 | 633 | 0.47 |
| B23 | HD 8 | 68 | 272 | 605 | 0.45 |
| B24 | HD 7 | 49 | 264 | 570 | 0.46 |
| LD 6 | N/A | N/A | 170 | 302 | 0.56 |

TABLE X

| Blend Example | Low Temperature Peak (° C.) | High Temperature Peak (° C.) |
|---|---|---|
| B16 | 71 | 99 |
| B17 | 76 | 100 |
| B18 | 75 | 98 |
| B19 | 80 | 99 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. An ethylene polymer composition comprising:
(i) a homogeneously-branched first ethylene polymer component; and
(ii) a homogeneously-branched second ethylene polymer component of higher density than the first ethylene polymer component;
wherein the amount of the second ethylene polymer component is in a range from about 4 to about 50 wt. %, based on the total weight of the first ethylene polymer component and the second ethylene polymer component; and
wherein the composition is characterized by:
a density in a range from about 0.912 to about 0.925 g/cm$^3$;
a melt index less than or equal to about 3.5 g/10 min; and
a CY-a parameter in a range from about 0.25 to about 0.65.

Aspect 2. The composition defined in aspect 1, wherein the composition has a density in any range disclosed herein, e.g., from about 0.912 to about 0.922 g/cm$^3$, from about 0.912 to about 0.92 g/cm$^3$, from about 0.915 to about 0.925 g/cm$^3$, etc.

Aspect 3. The composition defined in aspect 1 or 2, wherein the first ethylene polymer component has a density in any range disclosed herein, e.g., from about 0.89 to about 0.922 g/cm$^3$, from about 0.90 to about 0.92 g/cm$^3$, from about 0.905 to about 0.918 g/cm$^3$, from about 0.91 to about 0.918 g/cm$^3$, etc.

Aspect 4. The composition defined in any one of aspects 1-3, wherein the second ethylene polymer component has a density in any range disclosed herein, e.g., from about 0.93 to about 0.972 g/cm$^3$, from about 0.932 to about 0.97 g/cm$^3$, from about 0.93 to about 0.958 g/cm$^3$, from about 0.945 to about 0.968 g/cm$^3$, etc.

Aspect 5. The composition defined in any one of aspects 1-4, wherein the amount of the second ethylene polymer component is in any range disclosed herein, e.g., from about 4 to about 40 wt. %, from about 4 to about 25 wt. %, from about 4 to about 15 wt. %, from about 10 to about 40 wt. %, from about 10 to about 25 wt. %, from about 20 to about 30 wt. %, etc., based on the total weight of the first ethylene polymer component and the second ethylene polymer component Aspect 6. The composition defined in any one of aspects 1-5, wherein the composition and the first ethylene polymer component, independently, have a melt index (MI) in any range disclosed herein, e.g., less than or equal to about 3.5 g/10 min, less than or equal to about 2.5 g/10 min, less than or equal to about 1.5 g/10 min, from about 0.3 to about 2 g/10 min, from about 0.5 to about 1.8 g/10 min, from about 0.7 to about 1.7 g/10 min, etc.

Aspect 7. The composition defined in any one of aspects 1-6, wherein the second ethylene polymer component has a melt index (MI) in any range disclosed herein, e.g., less than or equal to about 50 g/10 min, less than or equal to about 40 g/10 min, less than or equal to about 10 g/10 min, from about 0.3 to about 2 g/10 min, from about 0.5 to about 40 g/10 min, from about 0.4 to about 12 g/10 min, etc.

Aspect 8. The composition defined in any one of aspects 1-7, wherein the composition, the first ethylene polymer component, and the second ethylene polymer component, independently, have a CY-a parameter in any range disclosed herein, e.g., from about 0.25 to about 0.65, from about 0.25 to about 0.6, from about 0.3 to about 0.65, from about 0.35 to about 0.65, from about 0.4 to about 0.65, from about 0.45 to about 0.65, etc.

Aspect 9. The composition defined in any one of aspects 1-8, wherein the composition, the first ethylene polymer component, and the second ethylene polymer component, independently, have a reverse short chain branching distribution (increasing comonomer distribution), e.g., the number of SCB per 1000 total carbon atoms of the polymer at Mw is greater than at Mn, and/or the number of SCB per 1000 total carbon atoms of the polymer at Mz is greater than at Mw, and/or the number of SCB per 1000 total carbon atoms of the polymer at Mz is greater than at Mn.

Aspect 10. The composition defined in any one of aspects 1-8, wherein the composition, the first ethylene polymer component, and the second ethylene polymer component, independently, have a flat short chain branching distribution (uniform comonomer distribution), e.g., a slope of a plot of the number of short chain branches per 1000 total carbon atoms versus the logarithm of molecular weight of the olefin polymer (determined via linear regression over the range from D15 to D85) is in a range from about −0.6 to about 0.6, and/or a percentage of data points deviating from the average short chain branch content by greater than 0.5 short chain branches per 1000 total carbon atoms (determined over the range from D15 to D85) is less than or equal to about 20%, and/or a percentage of data points deviating from the average short chain branch content by greater than 1 short chain branch per 1000 total carbon atoms (determined over the range from D15 to D85) is less than or equal to about 10%.

Aspect 11. The composition defined in any one of aspects 1-10, wherein the first ethylene polymer component and the second ethylene polymer component, independently, are produced using a zirconium-based metallocene catalyst system.

Aspect 12. The composition defined in any one of aspects 1-11, wherein the composition, the first ethylene polymer component, and the second ethylene polymer component, independently, have a ratio of HLMI/MI in any range disclosed herein, e.g., from about 10 to about 35, from about 15 to about 35, from about 15 to about 28, from about 15 to about 25, from about 12 to about 30, from about 12 to about 22, etc.

Aspect 13. The composition defined in any one of aspects 1-12, wherein the composition, the first ethylene polymer component, and the second ethylene polymer component, independently, have a ratio of Mw/Mn in any range disclosed herein, e.g., from about 1.8 to about 4.5, from about 2 to about 4, from about 2.2 to about 4, from about 2.2 to about 3.8, etc.

Aspect 14. The composition defined in any one of aspects 1-13, wherein the composition, the first ethylene polymer component, and the second ethylene polymer component, independently, have a ratio of Mz/Mw in any range disclosed herein, e.g., from about 1.6 to about 2.5, from about 1.7 to about 2.3, from about 1.8 to about 2.3, from about 1.7 to about 2.1, etc.

Aspect 15. The composition defined in any one of aspects 1-14, wherein the composition and the first ethylene polymer component, independently, have a Mw in any range disclosed herein, e.g., from about 85 to about 200 kg/mol, from about 85 to about 150 kg/mol, from about 100 to about 200 kg/mol, from about 100 to about 180 kg/mol, from about 100 to about 150 kg/mol, etc.

Aspect 16. The composition defined in any one of aspects 1-15, wherein the second ethylene polymer component has a Mw in any range disclosed herein, e.g., from about 85 to about 200 kg/mol, from about 85 to about 160 kg/mol, from about 100 to about 200 kg/mol, from about 40 to about 180 kg/mol, from about 40 to about 150 kg/mol, etc.

Aspect 17. The composition defined in any one of aspects 1-16, wherein a ratio of the Mw of the first ethylene polymer component to the Mw of the second ethylene polymer component is in any range disclosed herein, e.g., from about 1.1:1 to about 2.5:1, from about 1.1:1 to about 2:1, from about 1.1:1 to about 1.8:1, from about 1.2:1 to about 2.5:1, etc.

Aspect 18. The composition defined in any one of aspects 1-16, wherein a ratio of the Mw of the first ethylene polymer component to the Mw of the second ethylene polymer component is in any range disclosed herein, e.g., from about 0.5:1 to about 0.9:1, from about 0.6:1 to about 0.9:1, from about 0.65:1 to about 0.9:1, from about 0.7:1 to about 0.9:1, etc.

Aspect 19. The composition defined in any one of aspects 1-16, wherein a ratio of the Mw of the first ethylene polymer component to the Mw of the second ethylene polymer component is in any range disclosed herein, e.g., from about 0.75:1 to about 1.25:1, from about 0.8:1 to about 1.2:1, from about 0.9:1 to about 1.1:1, from about 0.8:1 to about 1.1:1, etc.

Aspect 20. The composition defined in any one of aspects 1-19, wherein the composition, the first ethylene polymer component, and the second ethylene polymer component, independently, have a unimodal molecular weight distribution.

Aspect 21. The composition defined in any one of aspects 1-20, wherein the composition and the first ethylene polymer component, independently, have a zero-shear viscosity in any range disclosed herein, e.g., from about 2,500 to about 25,000 Pa-sec, from about 3,000 to about 25,000 Pa-sec, from about 2,500 to about 20,000 Pa-sec, from about 3,000 to about 20,000 Pa-sec, etc.

Aspect 22. The composition defined in any one of aspects 1-21, wherein the second ethylene polymer component has a zero-shear viscosity in any range disclosed herein, e.g., from about 2,500 to about 25,000 Pa-sec, from about 5,000 to about 70,000 Pa-sec, from about 150 to about 2,500 Pa-sec, from about 500 to about 5,000 Pa-sec, etc.

Aspect 23. The composition defined in any one of aspects 1-22, wherein the composition, the first ethylene polymer component, and the second ethylene polymer component, independently, contain no measurable amount of hafnium or titanium.

Aspect 24. The composition defined in any one of aspects 1-23, wherein the first ethylene polymer component and the second ethylene polymer component, independently, are not produced using a hafnium-based and/or titanium-based catalyst system.

Aspect 25. The composition defined in any one of aspects 1-24, wherein the composition, the first ethylene polymer component, and the second ethylene polymer component, independently, contain less than 10 long chain branches (LCB), less than 8 LCB, less than 5 LCB, less than 3 LCB, etc., per million total carbon atoms.

Aspect 26. The composition defined in any one of aspects 1-25, wherein the composition is characterized by an ATREF curve containing at least two peaks, with a first peak (lower temperature peak) at a temperature in any range disclosed herein, e.g., from about 67 to about 82° C., from about 70 to about 82° C., from about 68 to about 80° C., etc.

Aspect 27. The composition defined in any one of aspects 1-26, wherein the composition is characterized by an ATREF curve containing at least two peaks, with a second peak (higher temperature peak) at a temperature in any range disclosed herein, e.g., from about 92 to about 105° C., from about 95 to about 105° C., from about 96 to about 105° C., etc.

Aspect 28. The composition defined in any one of aspects 1-27, wherein the composition is characterized by an ATREF curve containing at least two peaks in the temperature range from about 65 to about 105° C., and the difference between the temperatures of the two peaks ($\Delta T$) is in any range disclosed herein, e.g., from about 17 to about 32° C., from about 18 to about 32° C., from about 18 to about 30° C., etc.

Aspect 29. The composition defined in any one of aspects 1-28, wherein the composition is a single reactor product, e.g., not a post-reactor blend.

Aspect 30. The composition defined in any one of aspects 1-28, wherein the composition is a post-reactor blend.

Aspect 31. The composition defined in any one of aspects 1-30, wherein the composition, the first ethylene polymer component, and the second ethylene polymer component, independently, comprise an ethylene homopolymer and/or an ethylene/$\alpha$-olefin copolymer.

Aspect 32. The composition defined in any one of aspects 1-31, wherein the composition, the first ethylene polymer component, and the second ethylene polymer component, independently, comprise an ethylene homopolymer, an ethylene/1-butene copolymer, an ethylene/1-hexene copolymer, and/or an ethylene/1-octene copolymer.

Aspect 33. The composition defined in any one of aspects 1-32, wherein the composition, the first ethylene polymer component, and the second ethylene polymer component, independently, comprise an ethylene/1-butene copolymer, an ethylene/1-hexene copolymer, and/or an ethylene/1-octene copolymer.

Aspect 34. The composition defined in any one of aspects 1-33, wherein the composition, the first ethylene polymer component, and the second ethylene polymer component, independently, comprise an ethylene/1-hexene copolymer.

Aspect 35. The composition defined in any one of aspects 1-34, wherein the total amount of the first ethylene polymer component and the second ethylene polymer component in the composition is in any range disclosed herein, e.g., at least about 75 wt. %, at least about 85 wt. %, at least about 90 wt. %, at least about 95 wt. %, etc., based on the total weight of the composition.

Aspect 36. The composition defined in any one of aspects 1-35, wherein the composition further comprises any additive disclosed herein, e.g., an antioxidant, an acid scavenger, an antiblock additive, a slip additive, a colorant, a filler, a polymer processing aid, a UV additive, etc., or combinations thereof.

Aspect 37. An article of manufacture comprising (or produced from) the composition defined in any one of aspects 1-36.

Aspect 38. An article of manufacture comprising (or produced from) the composition defined in any one of aspects 1-36, wherein the article is an agricultural film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

Aspect 39. A film comprising (or produced from) the polymer composition defined in any one of aspects 1-36.

Aspect 40. The film defined in aspect 39, wherein the film has a haze (with or without additives) in any range disclosed herein, e.g., less than or equal to about 12%, less than or equal to about 10%, from about 2 to about 9%, from about 3 to about 8%, etc.

Aspect 41. The film defined in aspect 39 or 40, wherein the film has a clarity (with or without additives) in any range disclosed herein, e.g., at least about 95%, at least about 98%, at least about 98.5%, at least about 99%, etc.

Aspect 42. The film defined in any one of aspects 39-41, wherein the film has a dart impact strength in any range disclosed herein, e.g., greater than or equal to about 500 g/mil, greater than or equal to about 700 g/mil, greater than or equal to about 900 g/mil, greater than or equal to about 1400 g/mil, etc.

Aspect 43. The film defined in any one of aspects 39-42, wherein the film has a Spencer impact strength in any range disclosed herein, e.g., from about 0.4 to about 2 J/mil, from about 0.5 to about 1.5 J/mil, etc.

Aspect 44. The film defined in any one of aspects 39-43, wherein the film has a MD Elmendorf tear strength in any range disclosed herein, e.g., from about 100 to about 500 g/mil, from about 100 to about 450 g/mil, from about 125 to about 425 g/mil, from about 150 to about 450 g/mil, from about 200 to about 450 g/mil, etc.

Aspect 45. The film defined in any one of aspects 39-44, wherein the film has a TD Elmendorf tear strength in any range disclosed herein, e.g., from about 200 to about 800 g/mil, from about 250 to about 700 g/mil, from about 300 to about 600 g/mil, etc.

Aspect 46. The film defined in any one of aspects 39-45, wherein the film has a ratio of MD Elmendorf tear strength to TD Elmendorf tear strength (MD:TD) in any range disclosed herein, e.g., from about 0.3:1 to about 0.8:1, from about 0.4:1 to about 0.8:1, from about 0.3:1 to about 0.75:1, from about 0.4:1 to about 0.75:1, from about 0.5:1 to about 0.75:1, etc.

Aspect 47. The film defined in any one of aspects 39-46, wherein the film has an average thickness in any range disclosed herein, e.g., from about 0.4 to about 20 mils, from about 0.5 to about 8 mils, from about 0.8 to about 5 mils, from about 0.7 to about 2 mils, from about 0.7 to about 1.5 mils, etc.

Aspect 48. The film defined in any one of aspects 39-47, wherein the film is a blown film.

Aspect 49. The film defined in any one of aspects 39-47, wherein the film is a cast film.

We claim:

1. A film comprising an ethylene polymer composition, the composition comprising:
   (i) a homogeneously-branched first ethylene polymer component; and
   (ii) a homogeneously-branched second ethylene polymer component of higher density than the first ethylene polymer component;
   wherein the amount of the second ethylene polymer component is in a range from about 4 to about 50 wt. %, based on the total weight of the first ethylene polymer component and the second ethylene polymer component; and
   wherein the composition is characterized by:
   a density in a range from about 0.912 to about 0.925 g/cm$^3$;
   a ratio of Mw/Mn in a range from about 1.8 to about 4.5;
   a melt index less than or equal to about 3.5 g/10 min;
   a CY-a parameter in a range from about 0.25 to about 0.65; and
   an ATREF curve containing at least two peaks, with a first peak at a temperature in a range from about 67 to about 82° C., and a second peak at a temperature in a range from about 92 to about 105° C.

2. The film of claim 1, wherein the film has a MD Elmendorf tear strength in a range from about 100 to about 450 g/mil.

3. The film of claim 1, wherein the film has a ratio of MD Elmendorf tear strength to TD Elmendorf tear strength (MD:TD) in a range from about 0.3:1 to about 0.8:1.

4. The film of claim 1, wherein the film is a blown film having an average thickness in a range from about 0.5 to about 8 mils.

5. The film of claim 1, wherein the film is a cast film having an average thickness in a range from about 0.7 to about 2 mils.

6. The film of claim 1, wherein the film has:
   a haze of less than or equal to about 10%; and
   a dart impact strength of greater than or equal to about 500 g/mil.

7. The film of claim 1, wherein the film has:
   a MD Elmendorf tear strength in a range from about 125 to about 425 g/mil; and
   a TD Elmendorf tear strength in a range from about 200 to about 800 g/mil.

8. The film of claim 1, wherein:
   the composition has a Mw in a range from about 100 to about 200 kg/mol; and
   the composition comprises an ethylene homopolymer, an ethylene/α-olefin copolymer, or a combination thereof.

9. The film of claim 1, wherein the composition contains no measurable amount of hafnium or titanium.

10. The film of claim 1, wherein:
    the density is in a range from about 0.912 to about 0.922 g/cm$^3$;
    the ratio of Mw/Mn is in a range from about 2.2 to about 3.8;
    the melt index is in a range from about 0.5 to about 1.8 g/10 min; and
    the CY-a parameter is in a range from about 0.35 to about 0.65.

11. The film of claim 1, wherein the amount of the second ethylene polymer component is in a range from about 4 to about 25 wt. %, based on the total weight of the first ethylene polymer component and the second ethylene polymer component.

12. The film of claim 1, wherein a ratio of the Mw of the first ethylene polymer component to the Mw of the second ethylene polymer component is in a range from about 1.1:1 to about 2.5:1.

13. The film of claim 1, wherein a ratio of the Mw of the first ethylene polymer component to the Mw of the second ethylene polymer component is in a range from about 0.5:1 to about 0.9:1.

14. The film of claim 1, wherein the difference between the temperatures (ΔT) of the first peak and the second peak is in a range from about 17 to about 32° C.

15. The film of claim 1, wherein the first peak is at a temperature in a range from about 68 to about 80° C., and the second peak is at a temperature in a range from about 94 to about 105° C.

16. An ethylene polymer composition comprising:
    (i) a homogeneously-branched first ethylene polymer component; and
    (ii) a homogeneously-branched second ethylene polymer component of higher density than the first ethylene polymer component;

wherein the amount of the second ethylene polymer component is in a range from about 4 to about 50 wt. %, based on the total weight of the first ethylene polymer component and the second ethylene polymer component; and wherein the composition is characterized by:
- a density in a range from about 0.912 to about 0.925 g/cm$^3$;
- a ratio of Mw/Mn in a range from about 1.8 to about 4.5;
- a melt index less than or equal to about 3.5 g/10 min;
- a CY-a parameter in a range from about 0.25 to about 0.65; and
- an ATREF curve containing at least two peaks, with a first peak at a temperature in a range from about 67 to about 82° C., and a second peak at a temperature in a range from about 92 to about 105° C.

17. The composition of claim 16, wherein the composition:
- has a Mw in a range from about 100 to about 200 kg/mol;
- has a unimodal molecular weight distribution;
- contains no measurable amount of hafnium or titanium; and
- contains less than 10 long chain branches (LCB) per million total carbon atoms.

18. The composition of claim 16, wherein:
- the composition comprises an ethylene homopolymer, an ethylene/α-olefin copolymer, or a combination thereof;
- the composition is a single reactor product; and
- the difference between the temperatures (ΔT) of the first peak and the second peak is in a range from about 17 to about 32° C.

19. The composition of claim 16, wherein:
- the composition comprises an ethylene homopolymer, an ethylene/1-butene copolymer, an ethylene/1-hexene copolymer, an ethylene/1-octene copolymer, or any combination thereof;
- the composition is a post-reactor blend; and
- the first peak is at a temperature in a range from about 68 to about 80° C., and the second peak is at a temperature in a range from about 94 to about 105° C.

20. An article of manufacture comprising the composition of claim 16.

* * * * *